US012647463B2

(12) United States Patent　　　(10) Patent No.:　US 12,647,463 B2
Ghosh et al.　　　　　　　　　　(45) Date of Patent:　　Jun. 2, 2026

(54) CLOUD SECURITY POSTURE MANAGEMENT

(71) Applicant: Wells Fargo Bank, N.A., San Francisco, CA (US)

(72) Inventors: Prosanta Ghosh, Frisco, TX (US); Adrian Lane, Phoenix, AZ (US); Guangbei Li, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 118 days.

(21) Appl. No.: 18/524,306

(22) Filed: Nov. 30, 2023

(65) Prior Publication Data

US 2025/0184358 A1　　Jun. 5, 2025

(51) Int. Cl.
　　*H04L 9/40*　　　　(2022.01)
　　*H04L 41/0803*　　(2022.01)
　　*H04L 41/16*　　　(2022.01)

(52) U.S. Cl.
　　CPC .......... *H04L 63/20* (2013.01); *H04L 41/0803* (2013.01); *H04L 41/16* (2013.01); *H04L 63/105* (2013.01); *H04L 63/1433* (2013.01)

(58) Field of Classification Search
　　CPC . H04L 41/0803; H04L 63/20; H04L 41/0869; H04L 41/145; H04L 43/045; H04L 41/0686; H04L 41/142; H04L 63/1425; H04L 41/0816; H04L 41/0883; H04L 63/1433; H04L 63/1441; H04L 43/06; H04L 41/069; H04L 63/1416; H04L 41/16; H04L 63/105; G06F 21/577; G06F 8/75; G06Q 10/0635
　　See application file for complete search history.

(56) References Cited

U.S. PATENT DOCUMENTS

| 11,631,042 B2 | 4/2023 | Orzechowski et al. |
| 11,677,762 B2 | 6/2023 | Madi et al. |
| 2018/0270109 A1* | 9/2018 | Hollis ................. H04L 41/0803 |

(Continued)

FOREIGN PATENT DOCUMENTS

IN　　202321031941　　6/2023

OTHER PUBLICATIONS

"Testing to Ensure Your Security Posture Never Slouches", [Online]. Retrieved from the Internet: https: www.real-sec.com 2021 06 testing-to-ensure-your-security-posture-never-slouches , (Accessed on Aug. 3, 2023), 14 pages.

(Continued)

*Primary Examiner* — Kyung H Shin
(74) *Attorney, Agent, or Firm* — SCHWEGMAN LUNDBERG & WOESSNER, P.A.

(57)　　　　ABSTRACT

Systems and techniques for cloud security posture management are described herein. Cloud configuration data is obtained for a security asset of a cloud computing environment. The cloud configuration data is evaluated by a machine learning processor using a requirements control model to output a probability of a misconfiguration of the security asset. A mitigation action is generated for the security asset based on the probability of the misconfiguration being within a threshold. A cloud security configuration policy is updated for the security asset using the mitigation action and the mitigation action is transmitted to the security asset to modify a cloud configuration of the security asset.

21 Claims, 19 Drawing Sheets

(56) References Cited

U.S. PATENT DOCUMENTS

| | | | |
|---|---|---|---|
| 2019/0207981 A1* | 7/2019 | Sweeney | H04L 41/145 |
| 2021/0058430 A1* | 2/2021 | Novak | H04L 63/105 |
| 2022/0046059 A1 | 2/2022 | Pandurangi et al. | |
| 2022/0086193 A1 | 3/2022 | Nguyen et al. | |
| 2022/0141247 A1* | 5/2022 | Shakarian | H04L 63/1433 |
| | | | 726/25 |
| 2022/0272115 A1 | 8/2022 | Mcparland et al. | |
| 2022/0311797 A1 | 9/2022 | Shavlik et al. | |
| 2022/0337631 A1 | 10/2022 | Bhattacharya et al. | |
| 2023/0134945 A1 | 5/2023 | Ithal et al. | |
| 2023/0208869 A1 | 6/2023 | Bisht et al. | |
| 2023/0208871 A1 | 6/2023 | Yellapragada et al. | |
| 2024/0205237 A1* | 6/2024 | Tormasov | H04L 63/1416 |

OTHER PUBLICATIONS

"Cloud Security Posture Management CSPM", [Online]. Retrieved from the Internet: https: learn.microsoft.com en-us azure defender-for-cloud concept-cloud-security-posture-management, (Accessed on Aug. 1, 2023), 4 pages.

Enriquez, Rodolfo, "Cloud Security Posture Management CSPM in Azure", [Online]. Retrieved from the Internet: https: www.theseus.fi bitstream handle 10024 504136 Cloud%20Security%20Posture%20Management.pdf?sequence=2, (Jun. 25, 2021), 81 pages.

MacDonald, Neil, "Market Guide for Cloud Workload Protection Platforms", [Online]. Retrieved from the Internet: https: www.bitdefender-cn.com files Gartner%20CWPP%202021.pdf, (Jul. 12, 2021), 23 pages.

* cited by examiner

100

105

CLOUD COMPUTING PLATFORMS

120
CLOUD PLATFORM CONTROLS

110
APPLICATIONS

115
SECURITY ASSETS

125
REQUIREMENTS

130

135
CLOUD SECURITY POSTURE MANAGEMENT (CSPM) ENGINE

140
REQUIREMENTS AGGREGATOR

155
DATA COLLECTOR

165
POSTURE CALCULATOR

145
CONTROL LIBRARY

160
BENCHMARK ENGINE

170
MATURITY MODEL GENERATOR

150
POLICY GENERATOR

180
ML PROCESSOR

175
UI GENERATOR

FIG. 11

POSTURE SCORING MECHANISM — 1300

| # | CCF TOPICS (16) | RISK / EXPLOITABILITY | COVERAGE SCORE | WEIGHT (1 TO 5). THIS WILL BE USED TO COMPUTE WEIGHTED AVERAGE OF COVERAGE SCORE. | IDENTIFY INVENTORY MANAGEMENT | PROTECT SECURITY CONTROLS | DETECT THREATS AND SECURITY MISCONFIGURATION | RESPOND SECURITY INCIDENT, MITIGATION OF IDENTIFIED VULNERABILITIES. | RECOVER INCIDENT AND CONTINUE SECURITY OPERATION |
|---|---|---|---|---|---|---|---|---|---|
| 1 | APPLICATION SECURITY | HIGH | 65% | 5 | 0.5 | 0.4 | 0.6 | 0.45 | 0.5 |
| 2 | BUSINESS CONTINUITY AND RESILIENCY | HIGH | 65% | 5 | 0.5 | 0.4 | 0.6 | 0.45 | 0.5 |
| 3 | CLOUD CONTROL AND ASSURANCE | HIGH | 70% | 5 | 0.5 | 0.4 | 0.6 | 0.45 | 0.5 |
| 4 | CLOUD MANAGEMENT PLANE | HIGH | 65% | 5 | 0.5 | 0.4 | 0.6 | 0.45 | 0.5 |
| 5 | DATA PROTECTION | MEDIUM | 60% | 3 | 0.7 | 0.7 | 0.6 | 0.45 | 0.5 |
| 6 | IDENTITY AND ACCESS MANAGEMENT | HIGH | 65% | 5 | 0.5 | 0.4 | 0.6 | 0.45 | 0.5 |
| 7 | INCIDENT RESPONSE | MEDIUM | 80% | 3 | 0.85 | 0.75 | 0.8 | 0.6 | 0.8 |
| 8 | INFRASTRUCTURE PROTECTION | HIGH | 90% | 5 | 1.0 | 1.0 | 0.7 | 0.8 | 0.9 |
| 9 | IT ASSET MANAGEMENT | MEDIUM | 90% | 3 | 0.95 | 0.9 | 0.85 | 0.75 | 0.75 |
| 10 | LOGGING AND MONITORING | HIGH | 65% | 5 | 0.5 | 0.4 | 0.6 | 0.45 | 0.5 |

| | | | | | | | | | |
|---|---|---|---|---|---|---|---|---|---|
| 11 | RELATED CLOUD TECH AND SERVICES | HIGH | 65% | 5 | 0.5 | 0.4 | 0.6 | 0.45 | 0.5 |
| 12 | SAAS AND ENDUSER COMPUTING | HIGH | 65% | 5 | 0.5 | 0.4 | 0.6 | 0.45 | 0.5 |
| 13 | SECURITY HARDENING | HIGH | 65% | 5 | 0.5 | 0.4 | 0.6 | 0.45 | 0.5 |
| 14 | SECURITY TRAINING AND AWARENESS | LOW | 65% | 5 | 0.5 | 0.4 | 0.6 | 0.45 | 0.5 |
| 15 | THIRD PARTY RISK AND AWARENESS | HIGH | 65% | 5 | 0.5 | 0.4 | 0.6 | 0.45 | 0.5 |
| 16 | THREAT AND VULNERABILITY MANAGEMENT | HIGH | 65% | 5 | 0.5 | 0.4 | 0.6 | 0.45 | 0.5 |
| | WEIGHTED AVERAGE | | 81% | REPEATABLERESPONSIVE / GUARDRAILS | | | | | |

*1700*

1705

OBTAIN CLOUD CONFIGURATION DATA

1710

EVALUATE CLOUD CONFIGURATION DATA

1715

GENERATE MITIGATION ACTION

1720

UPDATE CLOUD SECURITY CONFIGURATION POLICY

1725

MODIFY CLOUD CONFIGURATION FOR SECURITY ASSET

CLOUD SECURITY POSTURE MANAGEMENT

TECHNICAL FIELD

Embodiments described herein generally relate to computer security and, in some embodiments, more specifically to cloud security posture management.

BACKGROUND

Resources in a cloud computing environment are dynamic, short-lived and continually evolving with high degree of agility. Enterprise applications and business functions may be deployed across multiple public and private clouds. Applications may be deployed on various forms of cloud platforms such as infrastructure-as-a-service (IaaS), platform-as-a-service (PaaS), software-as-a-service (SaaS), serverless platforms, containerized platforms, etc. Applications are expected to continually move across cloud providers or within a cloud across platforms as a result of re-platform, re-architecture, modernization, cost optimization, operational efficiency, and regulatory requirements. Overall, the cloud environment remains dynamic and agile throughout its lifecycle. Managing and continually monitoring security posture of such a dynamic application infrastructure platform is challenging and requires a data driven analytical approach. There is a need for an overarching management solution for security posture monitor and produce executive reports for security maturity model and health.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 11 is a block diagram of an example of a multi-cloud platform architecture for cloud security posture management, according to an embodiment.

DETAILED DESCRIPTION

Figure 1:
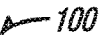
FIG. 1 is a block diagram of an example of an environment and a system for cloud security posture management, according to an embodiment.

As organizations move applications to public cloud infrastructure, cloud security posture management is becoming a challenging task. Workloads deployed in public cloud have multiple dimensions: (1) shared responsibility, (2) a complex vendor ecosystem, (3) a virtualized technology stack, (4) an ephemeral workload, and (5) software development lifecycle (SDLC) and pipeline. A step in cloud security management is to measure the security state of the cloud infrastructure and workload. Measurement may provide accurate tracking, accountability and ways to improve. The systems and techniques discussed herein describe a mechanism to measure cloud security posture.

As used herein the terms Data Plane and Control Plane describe separation of concerns or a clear separation of responsibilities within a system. Control plane provides mechanisms to establish user sessions and operate systems and data per organization policy. Data plane provides mechanisms to serve end-user requests. Data plane, also called user plane, typically carries network user traffic. The control plane, also called management plane, is an element within a system that configures, monitors, and provides management, monitoring, and configuration services to layers of the network stack and other parts of the system.

Cloud Security Posture Management (CSPM) is a set of cloud security capabilities that manage pre-deployment and post-deployment security risks by assessing configuration deviations and continuously monitoring cloud resources for internal and industry policy/compliance violations. CSPM operates at a cloud computing control plane.

CSPM solutions work by examining and comparing both live cloud environments and pre-defined cloud infrastructure templates against predefined policies and known security risks to accomplish the following objectives:

(1) Pre-deployment configuration adherence: Identify and prevent misconfigurations from approved policies prior to deployment.

(2) Post-deployment configuration adherence: Detect and respond to misconfigurations and configuration drift from approved policies post deployment.

(3) Cloud resource discovery: Discover deployed cloud resources, detect, and respond to unauthorized resources and support accuracy of the cloud resource inventory.

(4) Security posture measurements and integration: Provide security metrics to demonstrate adherence to (or deviation from) policy and provide a single pane view into a configuration state of deployed resources.

Modern-day complex applications deployed in a cloud computing environment may be potential targets for hackers that try to constantly find new ways to break into a network and steal data preventing the system from operating as intended. Protecting cloud workloads with a multi-dimensional attack surface is a challenge. One of the ways to solve this, is to use data-science to mine data continually to find patterns that deviate from a stable security state of the cloud computing environment. Identification using a pattern-based approach to find drifts in systems provides an opportunity to apply artificial intelligence (AI)/machine learning (ML) based algorithms to predict and prevent cyber-attacks and reduce risk.

The systems and techniques discussed herein use a variety of techniques to address security risks in a multi-dimensional attack surface provide by cloud computing environments. Data mining is used to identify patterns in system configurations. ML is used to create models for predictive analysis. User data visualization is used to identify vulnerabilities and threats. AI is used to build an intelligent security system that uses predictive analysis to predict cyber-attacks.

FIG. 1 is a block diagram of an example of an environment 100 and a system 135 for cloud security posture management, according to an embodiment.

The environment 100 includes cloud computing platforms (e.g., AZURE, GOOGLE Cloud, AMAZON Web Services, etc.) 105 that may host a variety of applications 110 that may be associated with security assets 115. The cloud computing platforms have cloud platform controls 120 that provide security controls for deploying and monitoring security for the applications 110 deployed in the cloud computing platforms 105. An organization may have a variety of security requirements 125 that may be defined by standards, regulations, best practices, security domain experts, etc. The system 135 may be executed by a server (e.g., a standalone server computing device, a virtualized server computing device, a cloud computing platform, a field programmable gate array (FPGA), an application specific integrated circuit (ASIC), etc.) 130. In an example, the system 135 may be a cloud security posture management (CSPM) engine.

The system 135 may include a variety of components including a requirements aggregator 140, a control library 145, a policy generator 150, a data collector 155, a benchmark engine 160, a posture calculator 165, a maturity model generator 170, a user interface (UI) generator 175, and a machine learning (ML) processor 180.

The requirements aggregator 140 obtains the requirements 125 and aggregates them into a unified requirement set. The control library 145 obtains the cloud platform controls 120 and generates an indexed catalog of available controls. The policy generator 150 receives a security asset 115 that may be associated with one or more applications 110. The policy generator 150 accesses the unified requirements from the requirements aggregator 140 and the indexed catalog of controls from the control library to select a set of controls for the security asset 115 that will fulfill the requirements. The generated policy is transmitted to the security asset 115 to be delivered to the applications 110 executing in the cloud computing platforms 105.

The policy generator 150 may use the ML processor 180 to build a policy model using training data including controls labeled with associated requirements fulfilled by the requirements. Additional models may be built by the policy generator 150 using the ML processor 180 including a control applicability model that defines controls that are applicable to a security asset 115 based on characteristics of the security asset 155. For example, an application may include a web interface and the ML processor 180 may receive configuration files as inputs and may output probabilities of controls that may be available for the application. A threshold may be established for the probabilities and a policy may be generated that includes the controls having probabilities within the threshold.

The system 135 continually monitors the cloud computing environments 105 to identify, mitigate, and remediate misconfigurations. The data collector 155 monitors security asset 115 data and provides data to the benchmark engine 160. The benchmark engine 160 compares the security asset 115 data to the unified requirements, indexed controls, and policy to identify whether a misconfiguration (e.g., an improperly configured control, an absent control, etc.) is present. Data output by the benchmark engine 160 is received by the UI generator 175. The UI generator 175 generates dashboard displays and reports using the received data.

The posture calculator 165 may receive data from the data collector 155 and use the received data to calculate a posture score for a security asset 115. The indexed controls in the control library 145 may be referenced to identify automated management tools associated with the controls. The availability of management tools for controls may be used in calculating the posture score. For example, a posture score may be calculated for the security asset 115 by dividing a number of qualified security controls that have associated automated management tools by a total number of available controls for the security asset 115. The posture calculator 165 provides various granularities for the posture scores. For example, posture scores may be calculated by security domain, by requirement objective, by security asset 115, etc. The posture calculator 165 also generates a total posture score for the computing environment as a whole by applying weights to individual posture scores based on importance associated with each of the posture scores.

Figure 13:
FIG. 13 is an example dashboard display of posture scores for cloud security posture management, according to an embodiment.

The maturity model generator 170 works in conjunction with the ML processor 180 to receive requirements data and generate maturity thresholds (e.g., as shown in TBL. 3, etc.). The UI generator 175 evaluates the posture scores using the maturity model to generate a maturity grid (e.g., as shown in FIG. 13, etc.).

Figure 2:
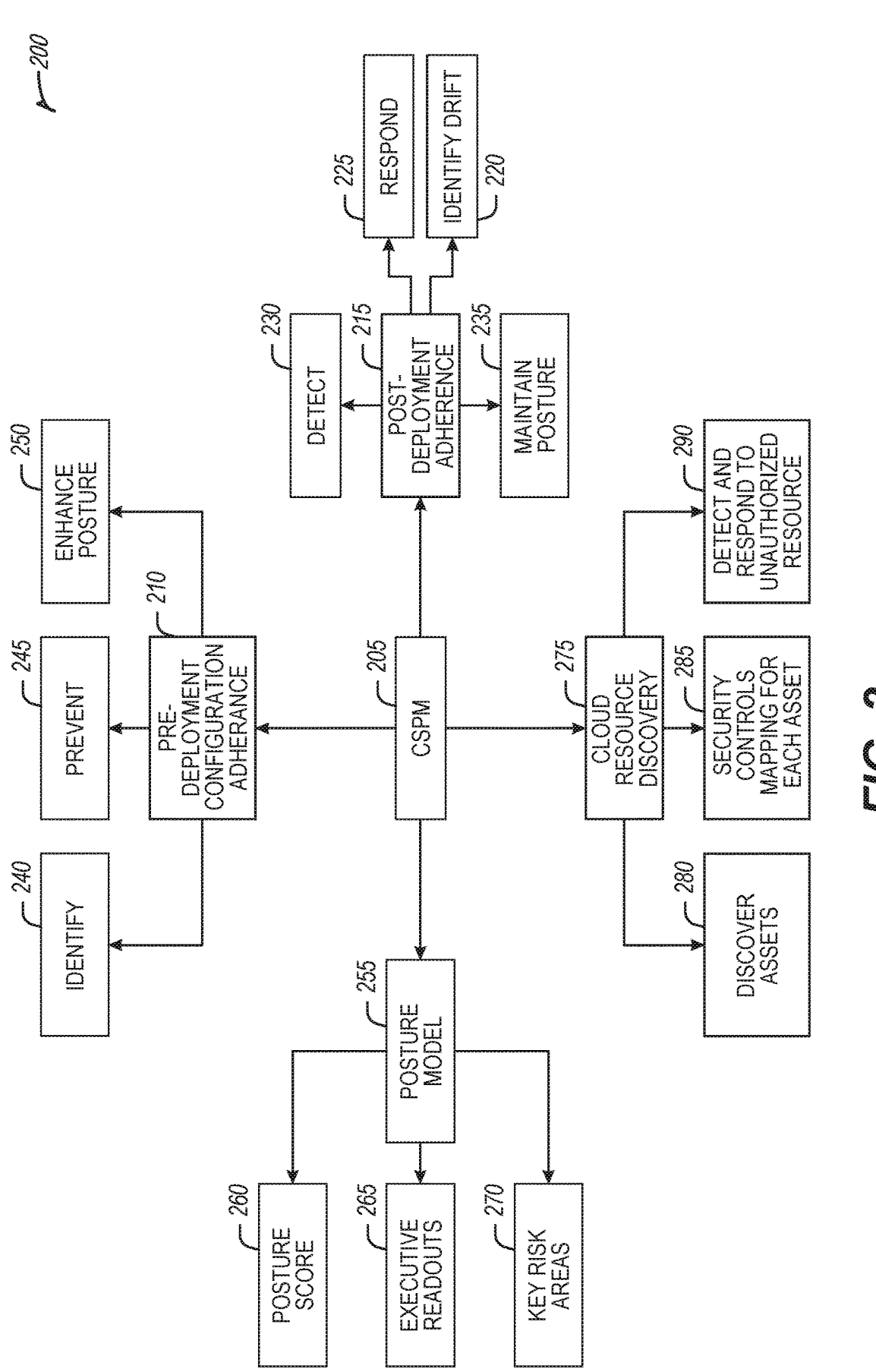
FIG. 2 is a block diagram of an example of an architecture for cloud security posture management, according to an embodiment.

FIG. 2 is a block diagram of an example of an architecture 200 for cloud security posture management, according to an embodiment.

CSPM 205 provides a mechanism to measure and improve security posture by detecting, preventing and remediating security misconfigurations with pre-deployment security configuration adherence 210 and post-deployment security configuration adherence 215. Configuration drift from approved policy is identified 220 and policy is deployed 225 as code at scale. Detection 230 and posture maintenance 235 are also driven by post-deployment adherence 215. Pre-deployment configuration adherence 210 enables identification 240 and prevention 245 of misconfigurations and enables posture enhancement 250.

A posture model 255 is used to evaluate configuration data to determine a posture score 260, executive readouts 256, and key risk areas 270. The configuration data is obtained through cloud resource discovery 275 to discover assets 280, security control mapping for each asset 285, and to detect and respond to unauthorized resources 290.

Figure 3:
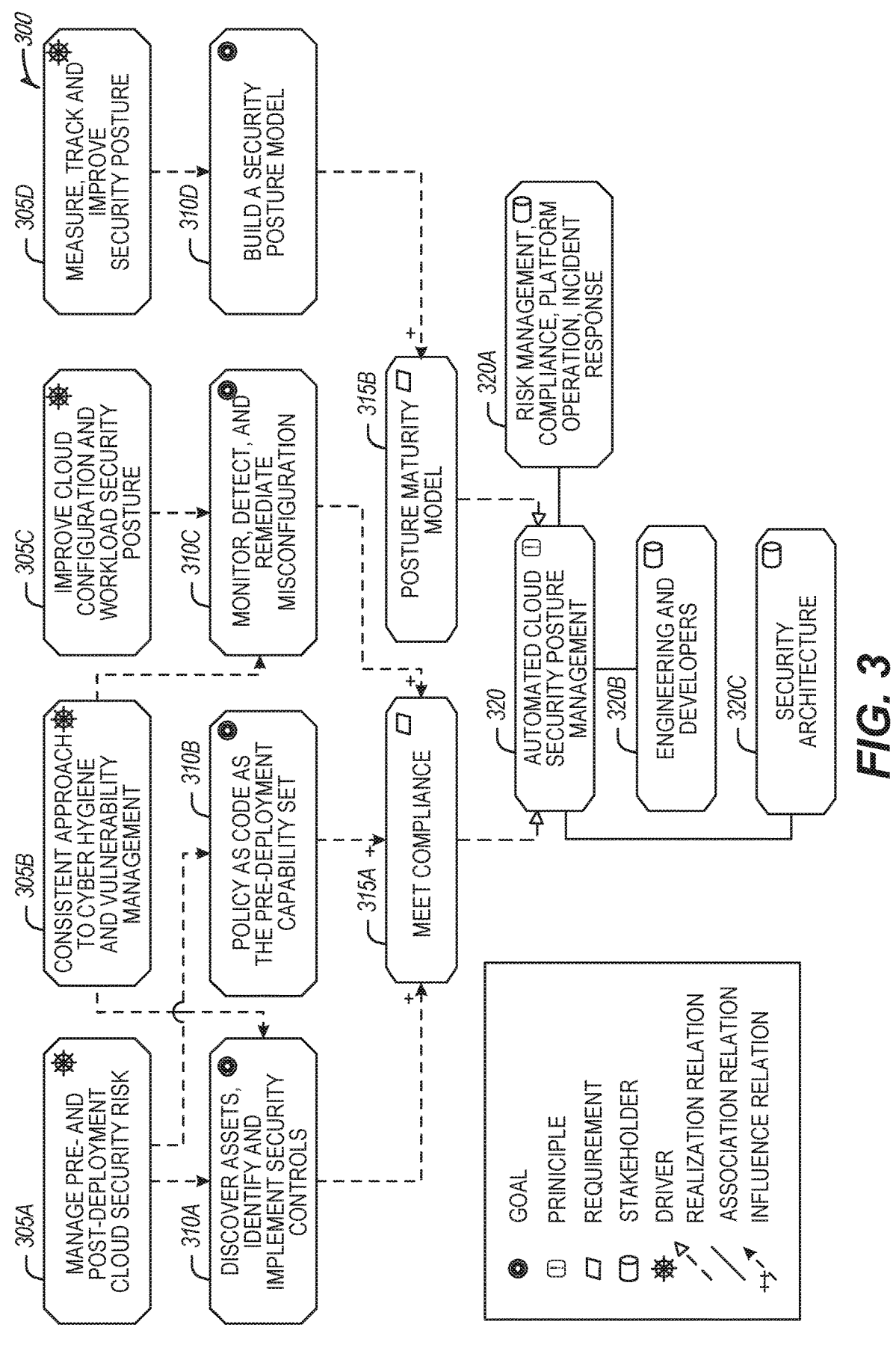
FIG. 3 is a flow diagram that illustrates relationships between cloud security posture management entities, according to an embodiment.

FIG. 3 is a flow diagram 300 that illustrates relationships between cloud security posture management entities, according to an embodiment. Entities may include drivers 305A, 305B, 305C, and 305D; goals 310A, 310B, 310C, and 310D; requirements 315A and 315B, principle 320, and stakeholders 325A, 325B, and 325C. Improvements are identified to safeguard compute, storage, and network resources provisioned in cloud computing platforms prior to deployment of changes that may alter volume, complexity, and sensitivity of workloads.

Relationships between the entities enable a consistent approach toward cyber hygiene and vulnerability management. The systems and techniques for CSPM discussed herein enable consistency by adopting a holistic approach toward managing assets, configurations, and security controls with a posture maturity model 315B for all stakeholders 325A, 325B, and 325C.

Figure 4:
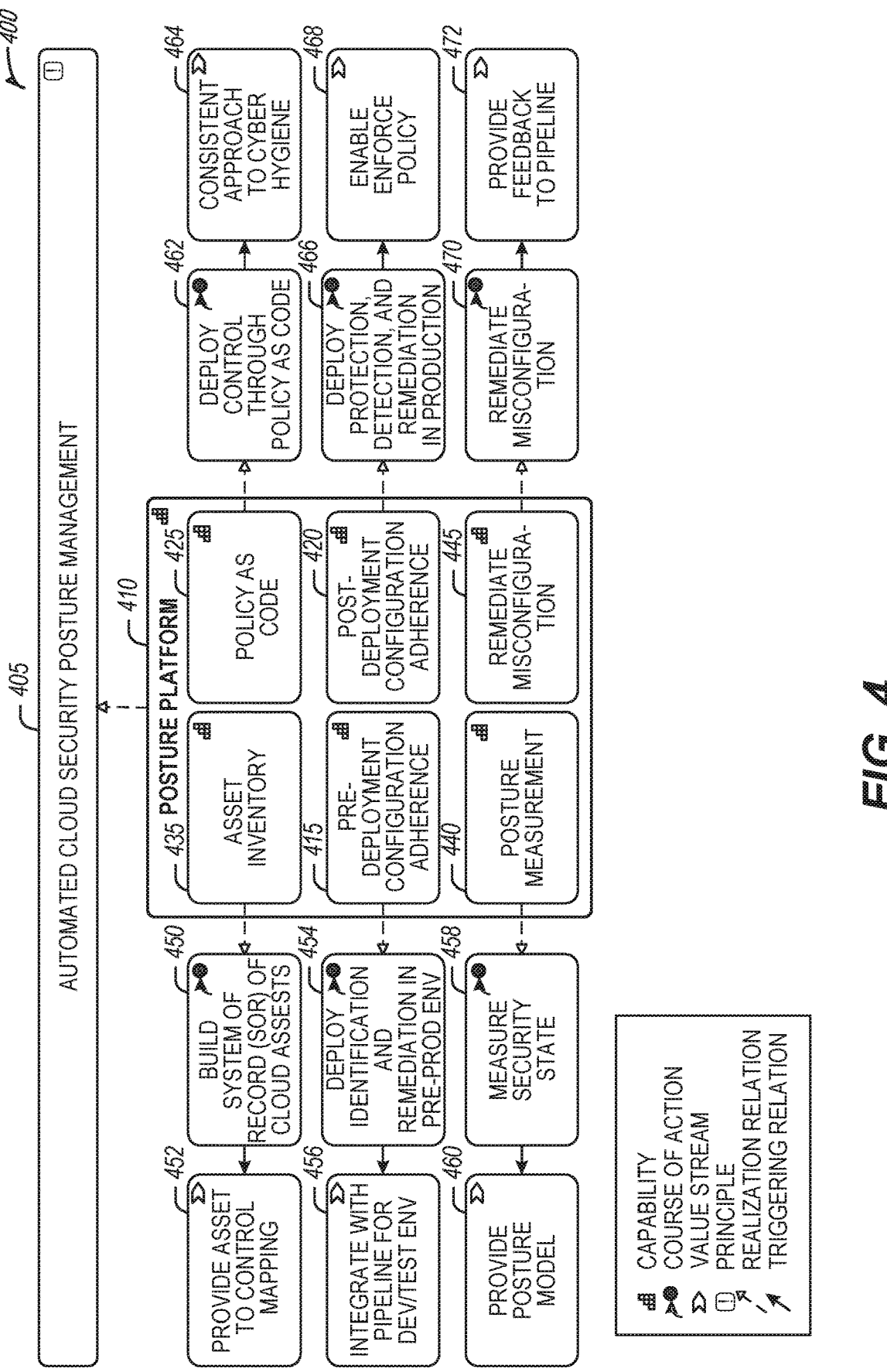
FIG. 4 is a flow diagram that illustrates dataflow for cloud security posture management utilizing a posture platform, according to an embodiment.

FIG. 4 is a flow diagram that illustrates a dataflow 400 for cloud security posture management 405 utilizing a posture platform 410, according to an embodiment.

CSPM 405 interacts with the posture platform 410 to influences both pre-deployment configuration adherence 415 and post-deployment configuration adherence 420. Pre-deployment configuration 415 deploys identification and remediation in the pre-deployment environment 454 and integrates with a pipeline for development and test environments 456. Post-deployment configuration adherence 420 deploys protection, detection, and remediation in production 466 and enables policy enforcement 468. Policy as code 425 deploys controls through policy as code 462 (e.g., using infrastructure as code, platform as code, etc.) using cloud provider security benchmarking and control tools enabling a consistent approach to cyber hygiene 464. Automation is used to continually improve security posture coverage. Asset inventory 435 builds a system of record (SOR) of cloud assets 450 and provides asset to control mapping 452. Posture measurement 440 is completed to for security assets and the cloud environment to measure security state 458 and provide a posture model 460 to track security posture over time. Configuration remediation 445 remediates misconfigurations 470 when identified and provides feedback to the pipeline 472 to improve security posture.

Figure 5:
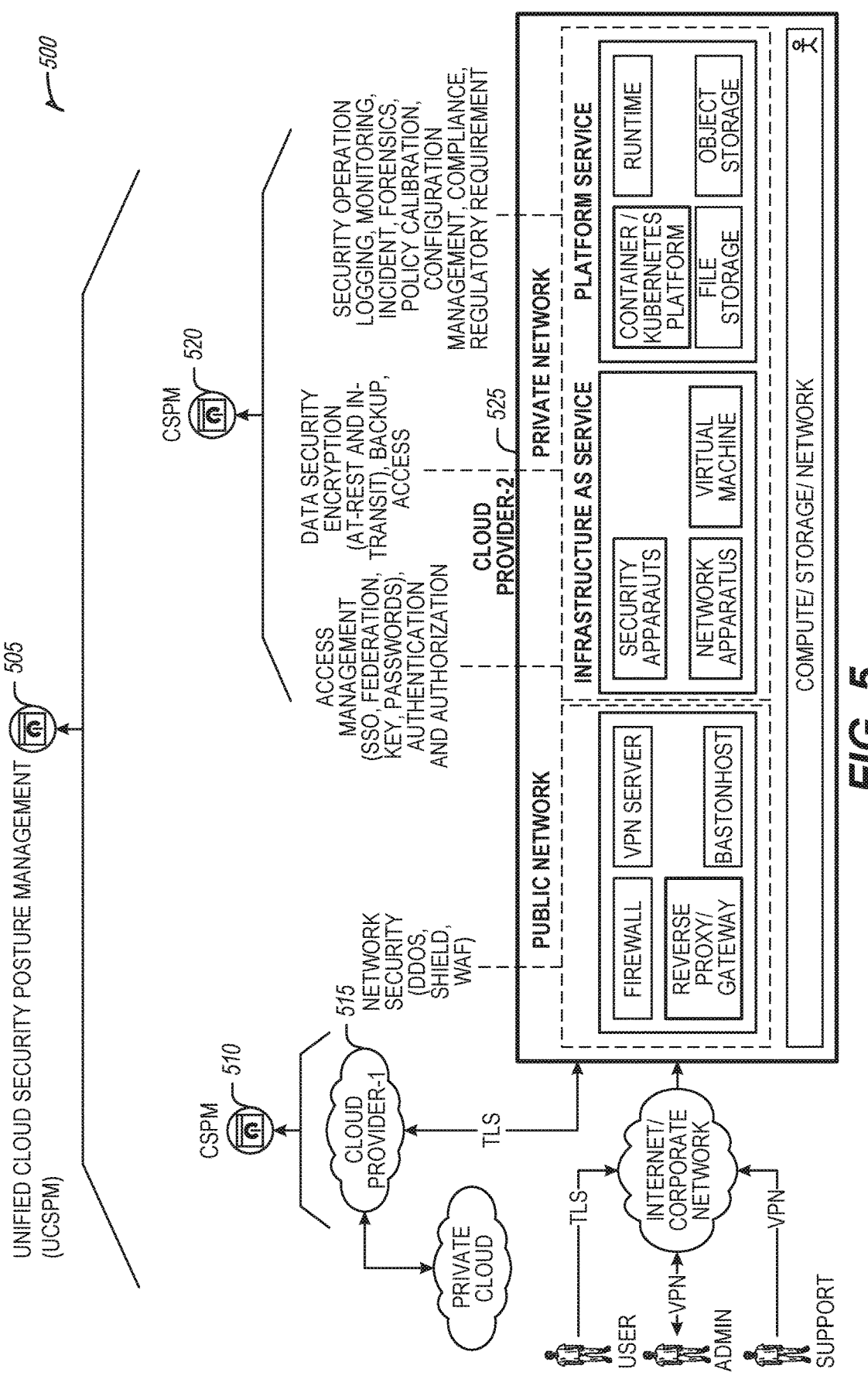
FIG. 5 is a block diagram of an example of a unified cloud security posture management environment, according to an embodiment.

FIG. 5 is a block diagram of an example of a unified cloud security posture management environment 500, according to an embodiment. CSPM (e.g., CSPM 510, CSPM 520, etc.) measures and monitors security posture of hybrid cloud and multi cloud environments (e.g., cloud provider 515, cloud provider 525, etc.) across all security domain areas such as identity and access management, network security, application security, cryptography (key, certificate management), security operation (logging, monitoring, incident response), vulnerability management, continuous patching, audit and compliance. Unified CSPM (UCSPM) 505 monitors the security posture of cloud environments and continually provides feedback to stakeholders across verticals.

Figure 6:
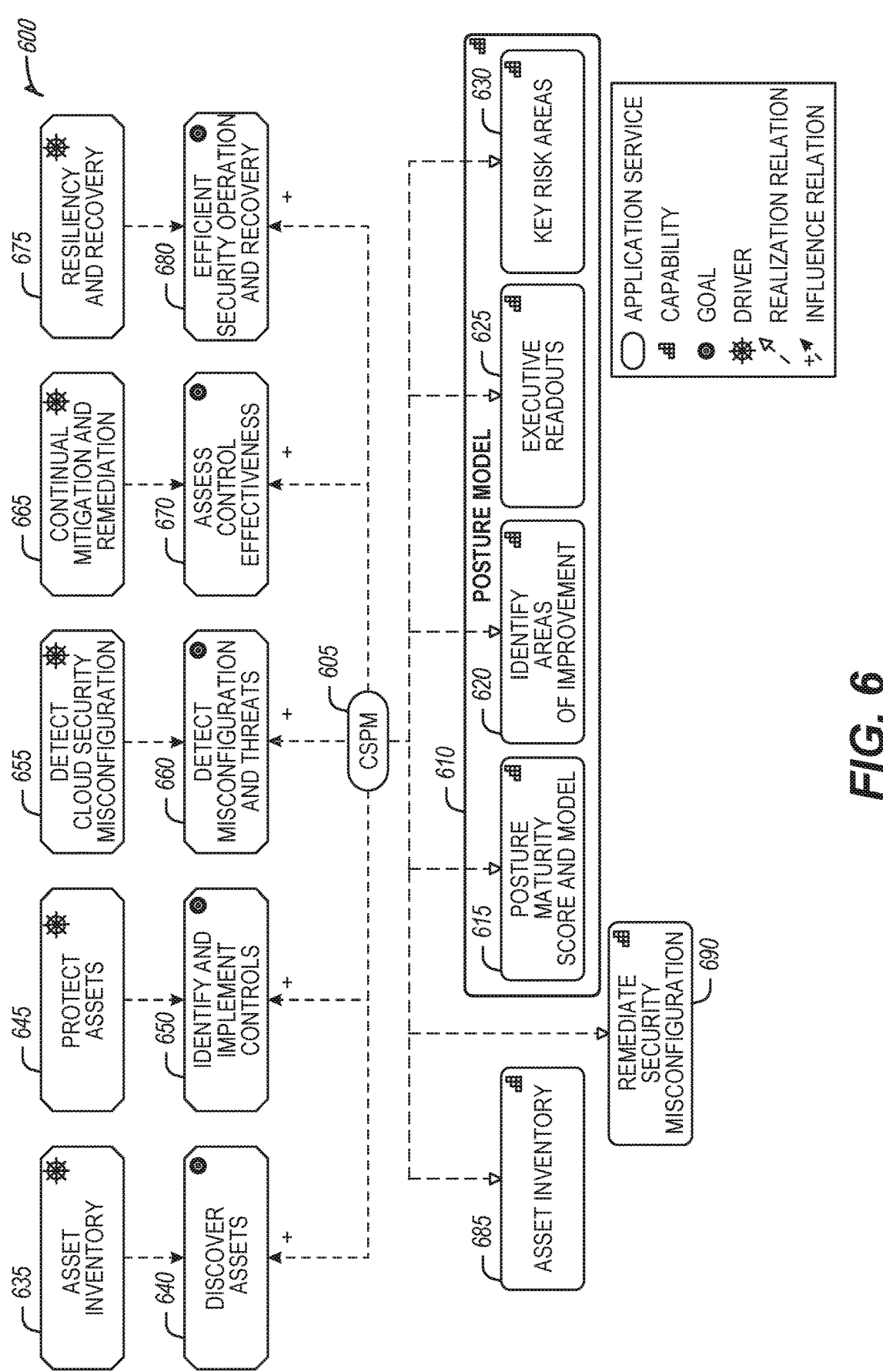
FIG. 6 is a block diagram of an example of a merged cybersecurity and risk management framework for cloud security posture management, according to an embodiment.

FIG. 6 is a block diagram of an example of a merged cybersecurity and risk management framework 600 for cloud security posture management, according to an embodiment. To protect and ensure reliable functioning of critical infrastructure, the National Institute of Standards and Technology (NIST) defines a Cybersecurity Framework (CSF). The CSF core provides a set of activities to achieve specific cybersecurity outcomes and references examples of guidance to achieve those outcomes. CSF defines key functions (identify, protect, detect, respond, and recover) for all category of cybersecurity outcomes. A NIST Risk Management Framework (RMF) provides a process that integrates security, privacy, and cyber supply chain risk management activities into the system development life cycle. RMF provides seven steps: (1) prepare, (2) categorize, (3) select controls, (4) implement controls, (5) assess control effectiveness, (6) authorize, and (7) monitor.

To effectively manage security posture in cloud, an amalgamation of CSF and RMF are merged into the framework 600. CSPM 605 provides the comprehensive framework 600 that addresses both NIST CSF and RMF for hybrid and multi-cloud environments using a posture model 610 that produces a posture maturity model and score 615, identifies areas of improvement 620, outputs executive readouts 625, and outputs an identification of key risk areas 630. The CSPM 605 also manages a protected asset inventory 685 and remediates security misconfigurations 690.

The CSPM 605 works in conjunction with an asset inventory 635 to discover assets 640. The CSPM 605 works in conjunction with asset protection 645 to identify and implement controls 650. The CSPM 605 works in conjunction with cloud security misconfiguration detection 655 to detect misconfigurations and threats 660. The CSPM 605 works in conjunction with continual mitigation and remediation 665 to assess effectiveness of implemented controls 670. The CSPM 605 works in conjunction with resiliency and recovery 675 to deliver efficient security operation and recovery from security threats 680.

Figure 7:
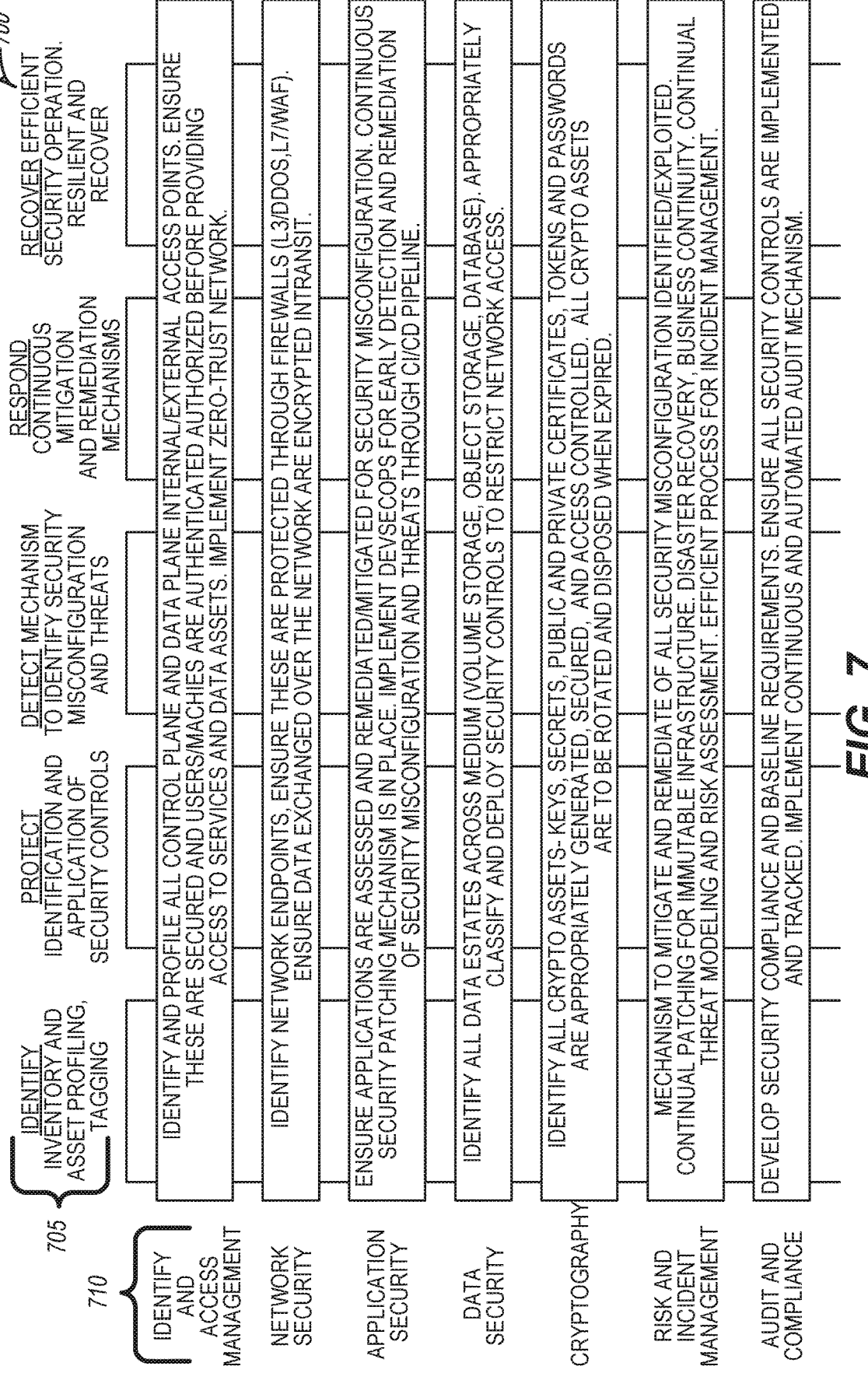
FIG. 7 is an example reference table that illustrates protection dimensions across elements of a cloud security posture management system, according to an embodiment.

FIG. 7 is an example reference table 700 that illustrates protection dimensions across elements of a cloud security posture management system, according to an embodiment. The reference table 700 illustrates intersections between the merged CSF and RMF framework (e.g., as illustrated in FIG. 6, etc.) 705 and security domains 710.

Figure 8:
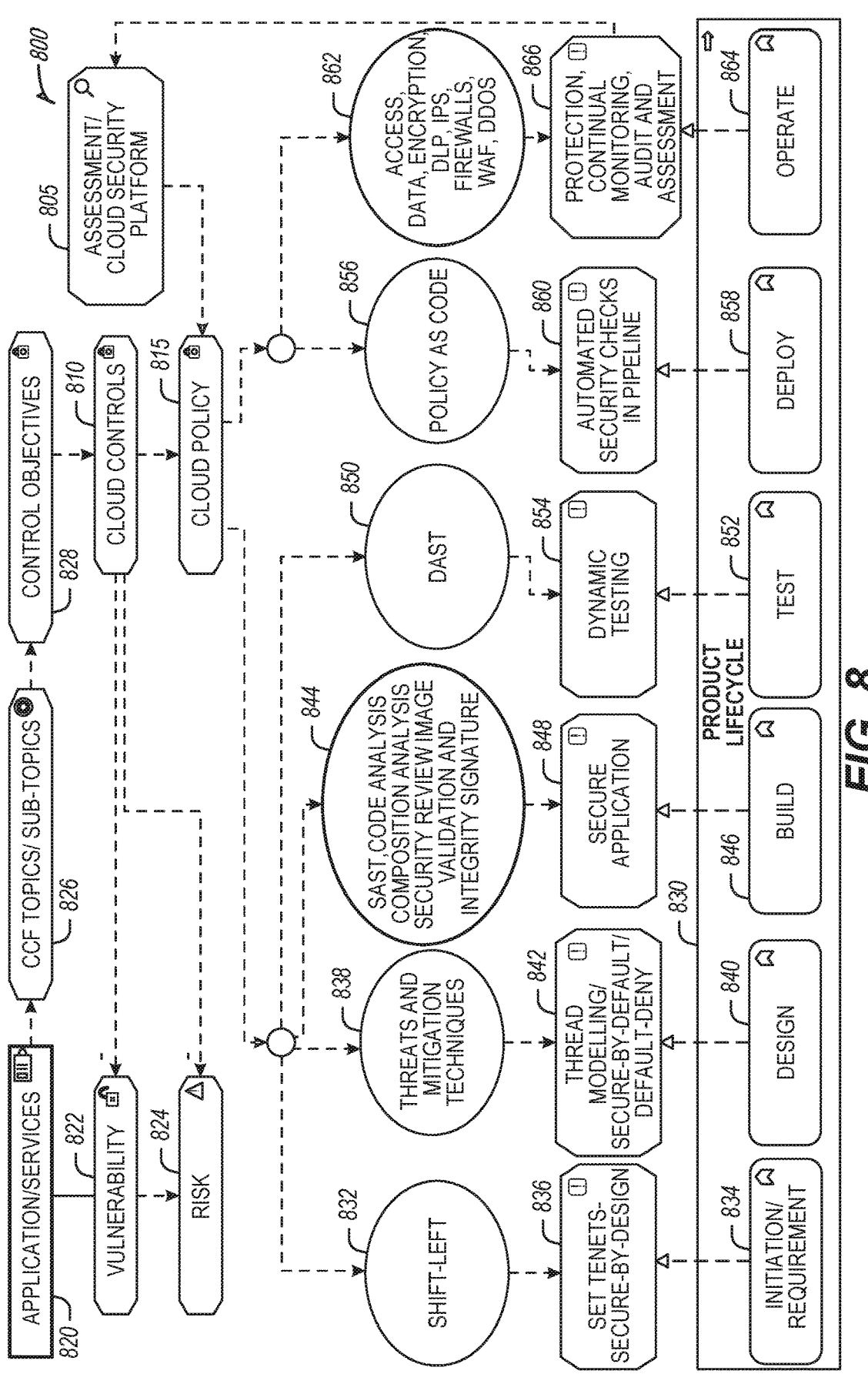
FIG. 8 is a block diagram of an example of security protection elements for cloud security posture management, according to an embodiment.

FIG. 8 is a block diagram of an example 800 of security protection elements for cloud security posture management, according to an embodiment. CSPM measures and monitors cloud infrastructure security state as defined by benchmarks and standards. CSPM captures the ability to protect information, systems, and assets while delivering business value through risk assessments and mitigation strategies. Assessment and cloud security platform data 805 is input along with available cloud controls 810 to generate a cloud policy 815 that is applied across a cloud computing environment. The cloud controls 810 are developed using application services data 820 that is used to identify vulnerabilities 822 and risks 824. The application services data 820 includes cloud configuration framework (CCF) topics and sub-topics 826 that are used to generate cloud objectives 828. The vulnerabilities 822, risks 824, and control objectives 828 are evaluated to generate the cloud controls 810.

Product lifecycle data 830 includes initiation and requirement data 834, design data 840, build data 846, test data 852, deployment data 858, and operations data 864. The cloud policy 815 is deployed to shift-left testing 832 to evaluate the initiation and requirement data 834 to set tenets such as secure-by-design 836. The cloud policy 815 is deployed to threat and mitigation techniques 838 to evaluate the design data 840 to perform thread modeling such as secure-by-default, default-deny, etc. 842. The cloud policy 815 is deployed to security testing (e.g., static application security testing (SAST), code analysis, composition analysis, security review, image validation, integrity signature, etc.) 844 to evaluate the build data 846 to apply security to application builds 848. The cloud policy 815 is deployed to dynamic application security testing (DAST) 850 to evaluate the test data 852 to perform dynamic security testing for applications 854.

The cloud policy 815 is deployed to the cloud computing environment using policy as code 856 to evaluate the deployment data 858 to inject automated security checks in the application development pipeline 860. The cloud policy 815 is deployed to infrastructure of the cloud computing environment (e.g., access, data, encryption, data loss prevention (DLP), intrusion prevention system (IPS), firewalls, web application firewall (WAF), distributed denial-of-service (DDoS) prevention, etc.) 862 to evaluate operations data 864 to inject protection, continual monitoring, audit, and assessment into operations 866.

Figure 9:
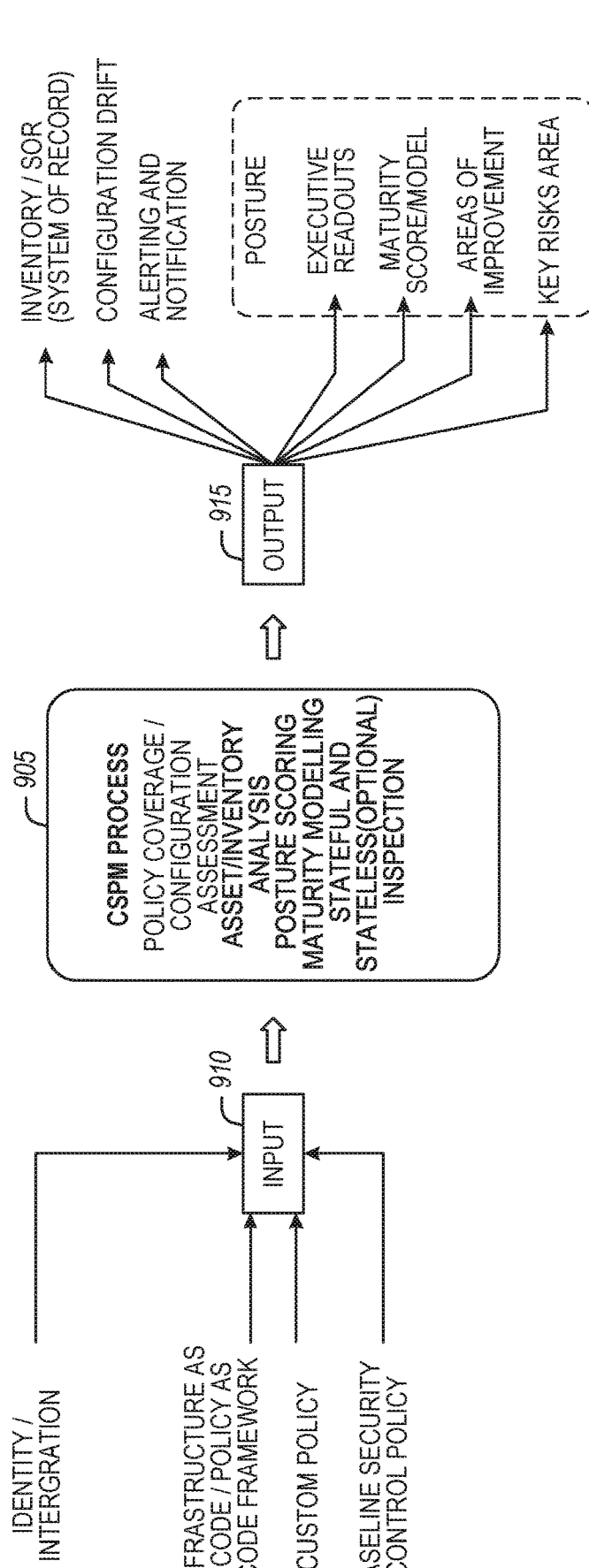
FIG. 9 is a block diagram of example cloud security posture management process inputs and outputs, according to an embodiment.

FIG. 9 is a block diagram of example 900 cloud security posture management process 905 inputs 910 and outputs 915, according to an embodiment. Inputs 910 may include identity/integration data, infrastructure as code/policy as code framework data, custom policy data, and baseline security control policy data. The CSPM process evaluates the inputs 910 and generates outputs 915 that may include an inventory/systems of record (SOR), configuration drift data, alters and notifications, and security posture data that may include executive readouts, a maturity score/model, identity of areas of improvement, and identity of key risk areas.

TBL. 1

| | |
|---|---|
| Identity and access management | IAM roles are compliant with principles of least privilege (Po LP). |
| Design functional IAM Roles based on the principle of least privilege. Create roles which have the minimum set of policies, scoped down with applicable actions, resources and conditions. | Monitor elevated credentials, such as administrative accounts and guard against privilege escalation. |
| | Ensure all access requests are approved by identity owner (manager), resource owner, and SOD (separation of duty) approver. Provide only temporary access for support and troubleshooting purposes. Associate temporary access to ticketing system. Continually assess and measure number of personal having administrative access to system indicating attack surface. Ensure that all human access uses federation. Ensure isolation between SDLC environments (dev, test, prod). Ensure that traffic stays private whenever possible. Inspecting your network for malicious traffic |
| Protect Infrastructure | Use immutable infrastructure with no human access. |
| Maintaining resource isolation between software development lifecycle (SDLC) environments reduces the chance of malfeasance and accidents in production environments. | Protecting access to your compute resources |
| | Configuring and hardening your compute resources. |
| | Configuring and hardening your container resources. |
| | Address emerging threats. |
| | Automate remediation of misconfigurations Conduct regular penetration testing. |
| Protect Data | Classify your data. |
| Use data classification to make determinations about safeguarding sensitive or critical data with appropriate levels of protection. | Protecting against ransomware |
| | Prevent malware infiltration by securing compute resources. |
| | Prevent attacker from accessing your data stores. Detect attacks with monitoring data access failures. Use frequent backups to recover from an attack. Restrict access based on classification. Minimize network paths to Data. Monitor/audit usage of data based on classification. |

TBL. 1 is an example reference guide for principles of posture management.

Figure 10:
FIG. 10 is a block diagram of an example of a posture management architecture for an individual cloud computing environment, according to an embodiment.
Figure 10:

FIG. 10 is a block diagram of an example of a posture management architecture 1000 for an individual cloud computing environment, according to an embodiment. The posture management architecture 1000 represents a benchmarking mechanism and a set of tools and relevant processes that constitutes a backbone of posture management systems. The posture management architecture 1000 is used to identify threats and security misconfiguration. An enterprise cloud security platform 1045 may provide inputs into cloud operations 1005. A security posture dashboard 1035 receives data from a first cloud provider control data stream 1050 and a second cloud provider control data stream 1055. The security posture dashboard 1035 outputs cloud alerts and notifications 1040 to analyze security risks and findings across cloud environments. The cloud alerts and notifications 1040 are used as additional inputs into the cloud operation 1005. The cloud operation 1005 outputs are used to configure security controls for a product release candidate 1010 to meet development, security, and operations 1015 requirements based on available cloud controls 1020 under the control of a control owner 1025. The final release cloud control policy for the product 1030 is implemented and monitored by the security posture dashboard 1035 to perform continuous monitoring and improvement.

Figure 11:
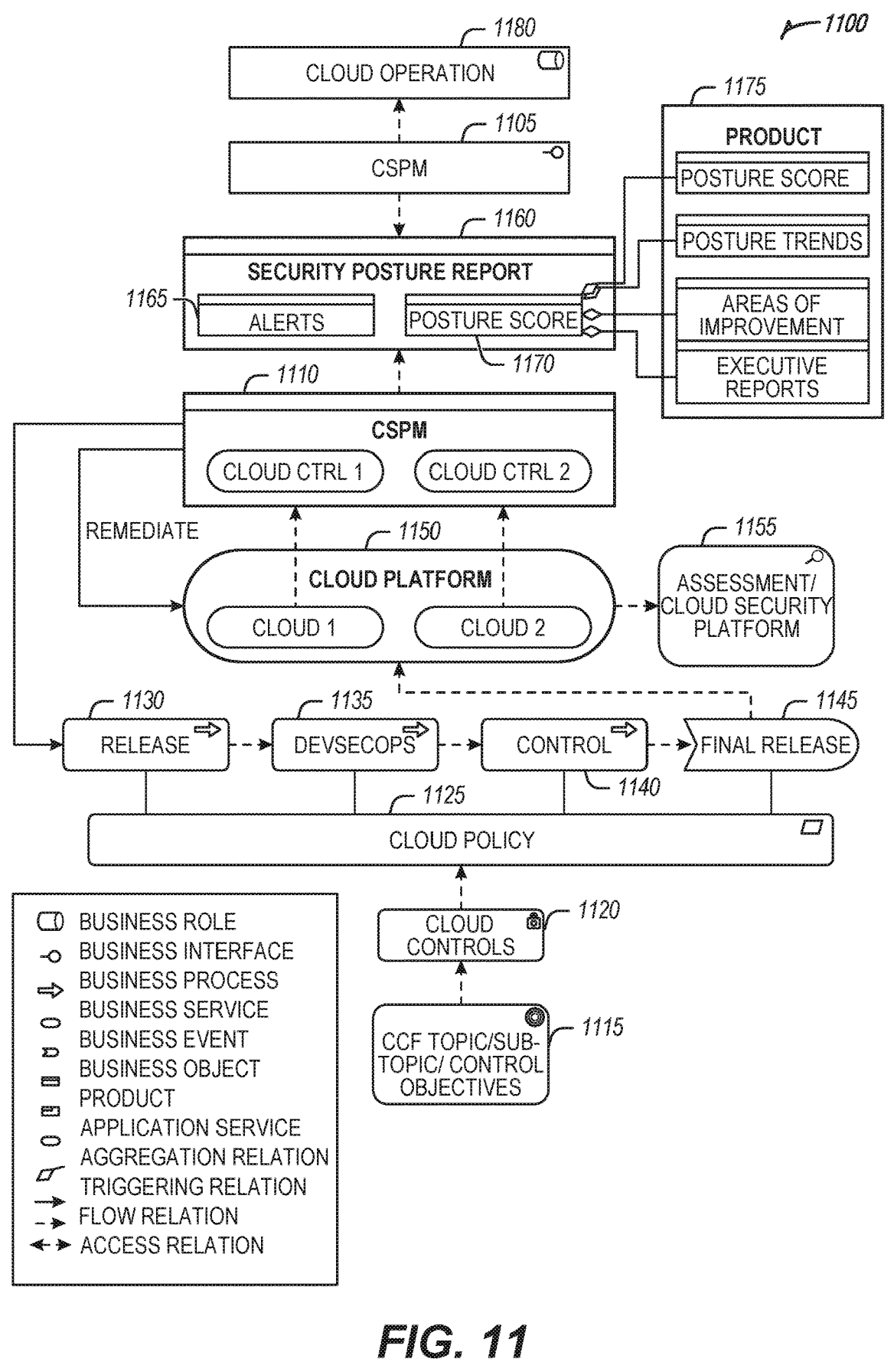

FIG. 11 is a block diagram of an example of a multi-cloud platform architecture 1100 for cloud security posture management, according to an embodiment. A multi-CSPM system 1105 aggregates data from cloud specific CSPMs 1110. The cloud specific CSPMs 1110 direct and monitor cloud controls for various cloud platforms 1150. Cloud controls 1120 are generated by inputting a fusion of control objectives 1115 to select a cloud control policy 1125. The cloud control policy 1125 is used to iteratively evaluate a product release 1130 through dev/see/ops validation 1135 and available control evaluation 1140 to arrive at a final release 1145 that implements the cloud policy 1125. The final release 1145 is deployed to the cloud platform 1150 and the cloud specific CSPM 1110 monitors for any available remediation. Operational data for the final release 1145 is output to a cloud security platform for assessment 1155.

The cloud specific CSPM 1110 outputs data that is used to generate a security posture report 1160 that includes alerts 1165 and a posture score 1170 for the final release 1145 and other applications and components operating in the cloud platform 1150. The posture score 1170 for the final release of the product 1145 is used to generate a variety of product specific information including a posture score, posture trends, areas of improvement, and executive reports.

The multi-CSPM system 1105 monitors and controls cloud operations 1180 based on security posture reports aggregated from the cloud specific CSPMs 1110. This allows the multi-CSPM system 1105 to assess threats and security misconfigurations vertically across technology stakeholders and horizontally across cloud platforms. A security state is identified and quantified and risk mitigation are identified to maintain risk at an acceptable level for the platform to operate. Quantification enables progress improvement tracking and security posture deterioration chronologically. Accurate measurement enables identification of areas of improvement.

Figure 12:
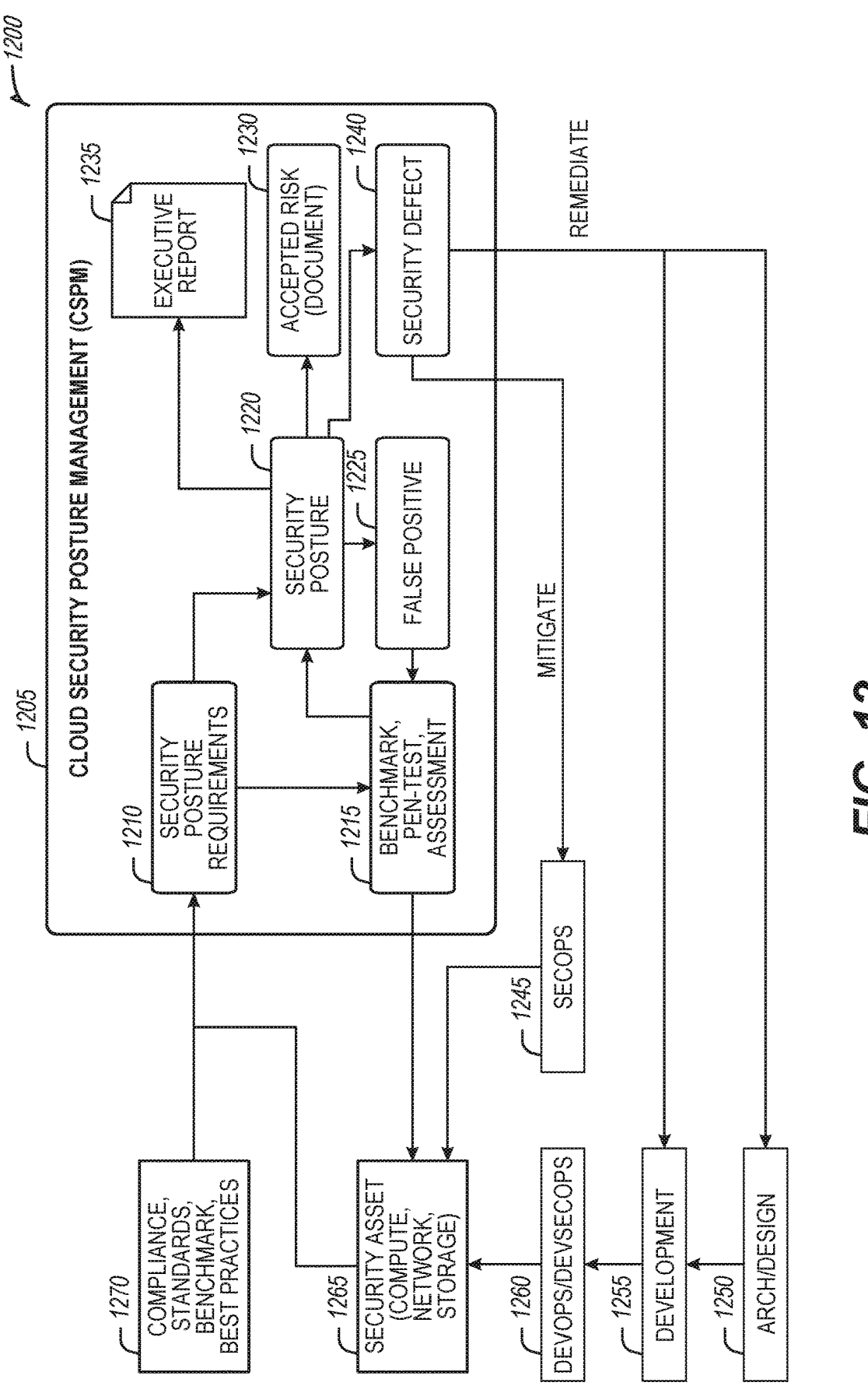
FIG. 12 is a block diagram of an example of a cloud security posture management process, according to an embodiment.

FIG. 12 is a block diagram of an example of a cloud security posture management process 1200, according to an embodiment.

A CSPM component 1205 is responsible for managing security state of the cloud platform and workloads to ensure the cloud-based system operates as intended, risk is minimized, and threats are eliminated that exploit security misconfigurations. The CSPM component 1205 depends on various asset and vulnerability management systems to provide monitoring of multiple systems involved with delivering cloud-based products.

The CSPM component 1205 includes security posture requirements 1210 that are used to perform benchmarks and assessments 1215. The security posture requirements may be derived from a set of requirements data 1270. The security posture requirements 1210 and the benchmarks and assessments 1215 are used to determine a security posture 1220. The security posture 1220 may result in a false positive 1225 which is confirmed or denied based on additional benchmarks and assessments 1215. The security posture 1220 may identify an accepted risk (e.g., a risk acceptance document, etc.) 1230 and may be used to generate an executive security posture report 1235.

If a security defect 1240 is identified in the security posture 1220, the security defect 1240 may be transmitted to security operations 1245 for mitigation of the affected security asset 1265. The security defect 1240 may be transmitted to architecture and design 1250 and then to development 1255 or directly to development 1255. developer operations and/or security operation 1260 may remediate the security asset 1265. The mitigation or remediation applied to the security asset 1265 are fed back into the CSPM component 1205 and used to update the security posture requirements 1210.

As the misconfigurations are identified in production system, the misconfigurations may be either mitigated/remediated or fed back into a DevSecOps pipeline as shown in TBL. 2.

TBL. 2

| Security misconfiguration Type | Remediation Strategy | Comments |
|---|---|---|
| Workload security misconfiguration (CIS benchmark) | Through Pipeline | |
| Cloud misconfiguration - Network ports, Storage Encryption controls, access management | Remediate in Production | Provide feedback to lifecycle through Jira. |
| Cloud mis-configuration - Architecture/Design (Zero-trust, insufficient logging) | Threat Modeling, Secure by Design | |

-continued

| TBL. 2 | | |
|---|---|---|
| Security misconfiguration Type | Remediation Strategy | Comments |
| IAM and access Management | Federated Identity, Entitlement Management | Discussion in-Progress to deploy entitlement management tools. |

CSPM operates in a multi-dimensional problem domain. It captures essence of SLDC process, DevSecOps pipeline, Multi-/Hybrid-cloud platform configuration, and application technology stack across various security domain. The complexity and multi-dimensional measurement criteria give rise to the need of flattened single dimensional maturity model for ease of comprehension and sharing model across organizational verticals.

There are various ways of building maturity model. Wells Fargo adopted an approach focusing on level of automation, security control coverage (NIST RMF and CSF), process maturity and responsiveness to mitigating threats and security misconfiguration as identified.

FIG. 13 is an example dashboard display 1300 of posture scores for cloud security posture management, according to an embodiment.

The example dashboard display 1300 uses a guideline to measure each aspect of NIST (CSF and RMF) across security domain areas in zero to one scale. A posture score is calculated for the platform based on a weighted average algorithm. A quantified posture score is mapped to a matuusing algorithms. Algorithms are derived jointly by business, architecture, and engineering.

CSPM provides a maturity model to effectively depict the current security state of the platform and provide guidance on how to improve the posture to meet organization business objectives. TBL. 3 illustrates an example of pasture score thresholds for a maturity model.

| TBL. 3 | |
|---|---|
| Posture Score | Cloud Posture Maturity |
| <20% | Adhoc |
| <40% | Partial |
| <60% | Risk Informed |
| <80% | Repeatable Responsive |
| <=100% | Adaptable |

TBL. 4 is an example of a maturity model.

| TBL. 4 | |
|---|---|
| Platform Posture Maturity | Posture Management Effectiveness |
| Ad hoc | Posture management processes and activities, including policies and procedures (as applicable) are in the process of being designed or implemented. Manually managing policies/procedures, mostly through console. Architectures resemble traditional infrastructure (e.g. low use of serverless and high reliance on network security controls). IAM mostly ad-hoc with little to no federation. |
| Partial | Posture management processes and activities, including policies and procedures (as applicable) have been designed and implemented, but are not yet effective in managing risk; gaps are being addressed. Initial use of infrastructure as code (Terraform/CloudFormation), but security not consistently engaged in design/review. Federation on some accounts, but limited use of MFA due to difficulties supporting teams (especially on the command line). |
| Risk Informed. | Security starting to review, design and promote use of Infrastructure as Code (IaC) and Platform as Code. Effectively manage posture with continual improvement. Respond to changes in the internal and external environment as needed. Have elements of integration with some business and risk processes; additional points of integration are in development. |
| Repeatable, Responsive | Effectively manage posture in a proactive manner, such as via performance metrics. Are sufficiently agile to rapidly respond to changes in the internal and external environment. Are integrated with relevant business and risk processes; data sources are not yet fully aligned. |
| Adaptable | Effectively manage posture in a proactive manner, such as via performance metrics, leveraging technology solutions when applicable. Systematically respond to changes in the internal and external environment. Are integrated with relevant business and risk processes, with data source alignment and connectivity. | rity model for comprehending platform security state and risk posture. Values in the shaded area are examples used for demonstration. Actual values are computed continually When a security misconfiguration is defected, it is important to assess its exploitability and impact. There are various mechanisms to determine the severity of security misconfiguration. The below method influenced from NIST NVD CVSS scoring mechanism provides a comprehensive and easy way to measure. TBL. 5 provides an example of exploitability metrics and TBL. 6 provides an example of impact metrics.

| TBL. 5 | |
| --- | --- |
| Exploitability Metrics | Possible Values |
| Attack Vector | Network, Adjacent Network, Local, Physical |
| Attack Complexity | Low, High |
| Privileges Required | None, Low, High |
| User Interaction (UI) | None Required |
| Scope | Unchanged, Changed |

| TBL. 6 | |
| --- | --- |
| Impact Metrics | Possible Values |
| Confidentials | None, Low, High |
| Integrity | None, Low, High |
| Availability | None, Low, High |

Figure 14:
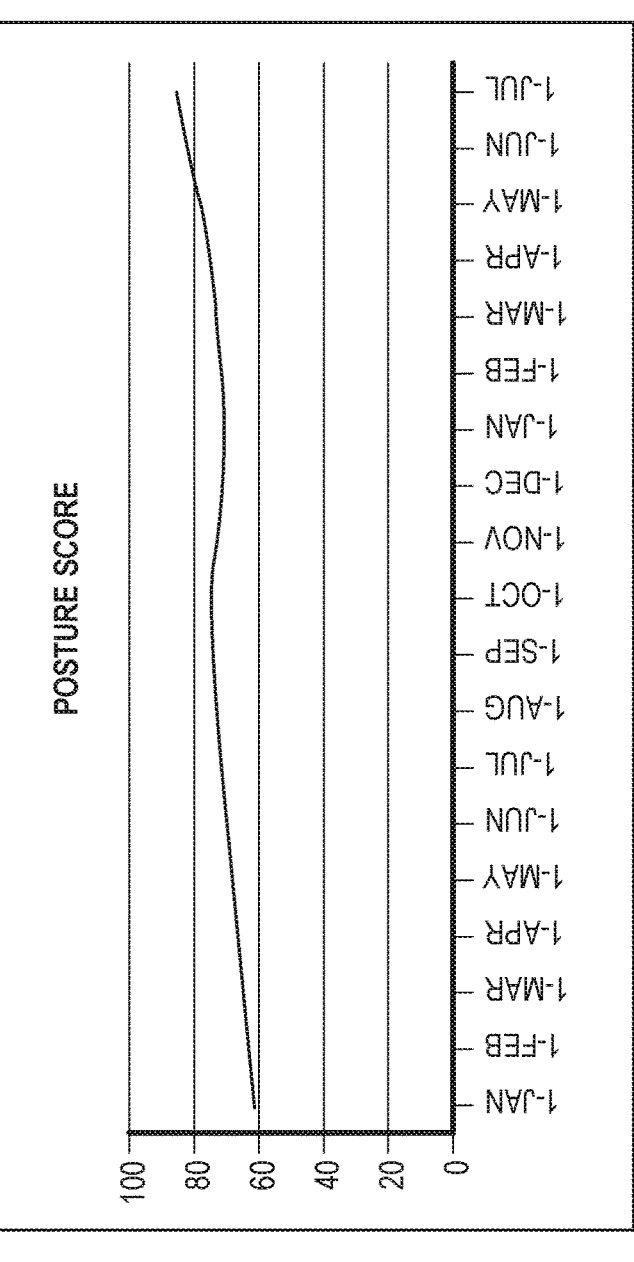
FIG. 14 is a graph illustrating an example of posture scores over time for cloud security posture management, according to an embodiment.

FIG. 14 is a graph 1400 illustrating an example of posture scores over time for cloud security posture management, according to an embodiment. As shown in the graph 1400, CSPM plots posture improvement over time to illustrate effectiveness of controls implemented in a cloud computing environment. The posture score is generated by evaluating the existing controls and available controls using a posture model. The posture score may represent to what extent available controls have been implemented as well as the level of control automation available for deployed controls.

Figure 15:
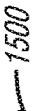
FIG. 15 is a graph illustrating an example of frequency\density of vulnerabilities for cloud security posture management, according to an embodiment.
Figure 15:
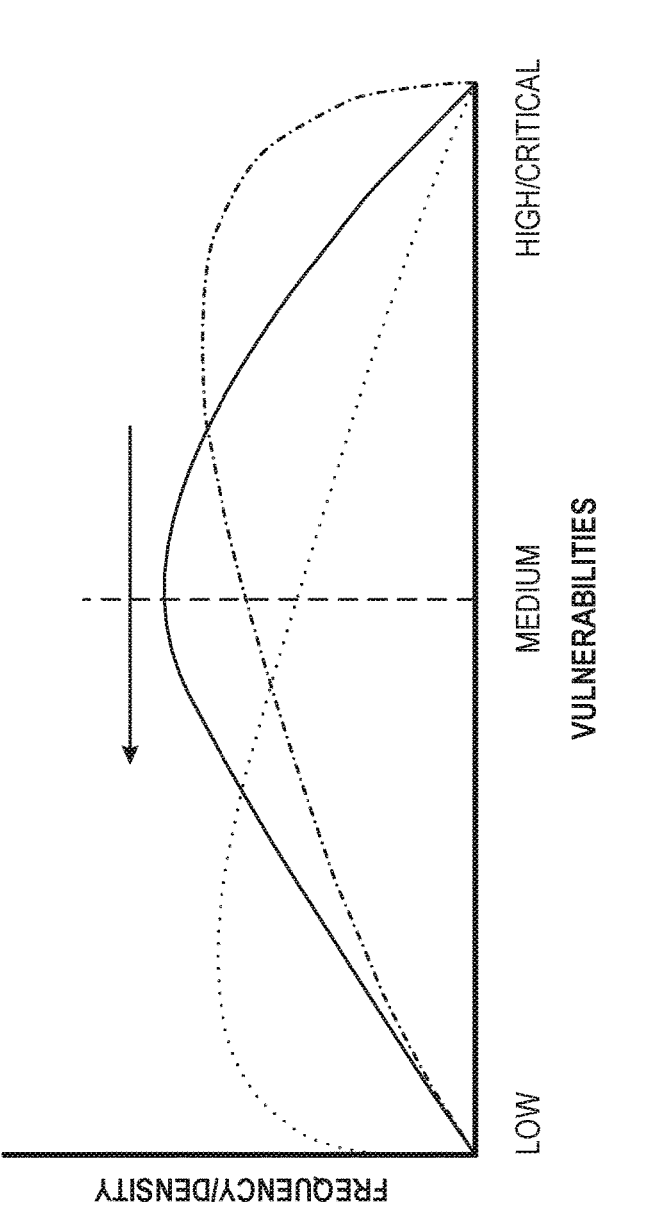

FIG. 15 is a graph illustrating an example of frequency\density of vulnerabilities for cloud security posture management, according to an embodiment. CSPM plots the security misconfiguration data in a normal distribution chart. A typical distribution looks like a skewed left graph. A desired state should result in a skewed right graph with lower density of high/critical security misconfiguration.

TBL. 7 illustrates an example of tags that may be used by CSPM to evaluate security posture. Tagging is the practice of assigning metadata or labels to cloud resources such as virtual machine, storage, buckets, databases for a variety of purposes such as Attribute Based Access Control (ABAC), Cloud Financial Management, and automation (e.g., patching for select tagged instances, etc.).

Tagging may be used to create new resource constructs for visibility or control (e.g., grouping together resources that make up a micro-service, application, or workload, etc.). Tagging provides enterprise-level visibility, control and security.

Purpose of tagging cloud resources:

Security and compliance management: Tag helps identifying resources with access restriction, compliance requirement, patching schedule, clustering resources, and isolation. Security operation and risk management team utilizes tags to identify and query resources with specialized security need.

Resource categorization: Tags provides mechanism to classify resources based on attributes such as environment (development, staging, production), line of business (commercial banking, retail baking), department (HR, finance, marketing), Accessibility (PAA, internal) or any custom tags as per need of the organization.

Cost allocation and budgeting: Tags helps cost allocation, budgeting, consumption, utilization of allocated resources. By assigning tags to resources one can track and analyze cost associated to different resources.

Operational visibility and governance: You can identify all resources belonging to a particular project or department and review configuration ensuring compliance with security policies or regulation requirements.

Automation and resource management: You can setup rules to automatically shut down resources with a particular tag during non-business hours, thus paving ways to save cost and reduce carbon footprint leading towards sustainable environment.

Resource life-cycle management: Manage the lifecycle of resources by assigning appropriate tags such as active, achieved, or deprecated. You can thus identify resources needing attention, retire, or isolate. This paves way to reduce cost, improve security posture.

| TBL. 7 | | | |
| --- | --- | --- | --- |
| TAG KEY | TAG Purpose | SAMPLE TAG VALUES | OBSERVATIONS |
| Owner | This tag is used to indicate the owner of the resource. | Security Lead, SecOps, Workload-1-Development-team | This value should represent a team or a title, given that humans come and go, but the function would remain within your environment. |
| BusinessUnitID | This tag indicates the business unit for the resource. | Finance, Retail, API-1, DevOps | |
| Environment | This tag is used to indicate the lifecycle stage for the resource. | Sandbox, Dev, PreProd, QA, Prod, Testing | |

-continued

| | | SAMPLE TAG | |
|---|---|---|---|
| TAG KEY | TAG Purpose | VALUES | OBSERVATIONS |
| CostCenter | This tag is used to indicate the cost center associated with the resource. | FIN123, Retail-123, Sales- 248, HR-333 | |
| FinancialOwner | This tag is used to indicate the Financial Owner associated with the resource. | HR, SecurityLead, DevOps- 3, Workload-1- Development- team | This value should represent a team or a title, given that humans come and go, but the function would remain within your environment. |
| Compliance | This tag is used to indicate if the resource is subject to any compliance requirement. | N/A, NIST, HIPAA, GDPR, | |
| Lifespan | This tag identifies the lifetime of the resources of the workload. If exceeded, these resources should be reviewed, replaced, or isolated. | 18 months, 2 years | |
| Created by | Individual or process created the resource. | IaC pipeline, | |
| Created on | Date of creation | Jan. 1, 2024 | |
| Updated | Last updated | Feb. 1, 2024 | |

Example recommended tags may include but are not limited to:

Owner: This tag indicates who is the owner and main user of the resource. This can be a team or an individual.

BusinessUnitId: This tag identifies the business unit the resource belongs to.

Environment: This tag indicates if the resources are being used for production or for non-production. (For example, development, test, or sandbox.)

CostCenter: This tag specifies the budget or account that will be used to pay for the spend associated with the tag.

DataClassification: This tag identifies if the resource contains, stores, or uses any type of special or sensitive data.

Example discretionary tags may include but are not limited to:

WorkloadId: This tag identifies if the resource belongs to a specific workload. The value can be the workload ID or name.

Compliance: This tag identifies the resources that are subject to a specific compliance framework. (e.g., Payment Card Industry Data Security Standard (PCI-DSS), Health Insurance Portability and Accountability Act (HIPAA), etc.).

Version: This tag identifies the version of the environment, in the event that the same workload has more than one associated environment.

WorkloadTier: This tag identifies the type of workload the resources belong to. Example workload types include, but are not limited to, confidential, internal, or critical.

Backup: This tag identifies if the resource needs to be backed up based on the type of workload and the data that it manages.

SLA: This tag identifies SLA requirements.

Lifespan: This tag identifies the lifetime of the resources of the workload. If exceeded, these resources should be reviewed, replaced, or isolated.

Tags are assigned to resources at the time of asset creation. Realignment and alteration of tags post creation of assets is performed only by authorized personal/processes. Unauthorized modification of tags is monitored, logged, and alerted. Such events are treated as a security event and disposed of appropriately as per data integrity security controls.

There are various ways tags may be assigned and managed. Traditionally tags are directly associated to cloud assets and restrictions are placed to ensure tagging polices are enforced. If the resources are cataloged and metadata is stored in an external inventory management system, tags may be managed through the external inventory management system.

Tags may be assigned hierarchically. For a particular cloud computing platform, tags may be assigned at various levels in a resource hierarchy such as by Management Group, Subscription, Resource Group, Resource, etc. Tags assigned to parent object in the hierarchy are inherited by a child resource.

A hybrid approach may be followed in which tag assignments are made through a resource, a parent object in a hierarchy, and an inventory management system. Irrespective of tag assignment point, a uniform life cycle is followed ensuring tags are in sync and reliable.

Figure 16:
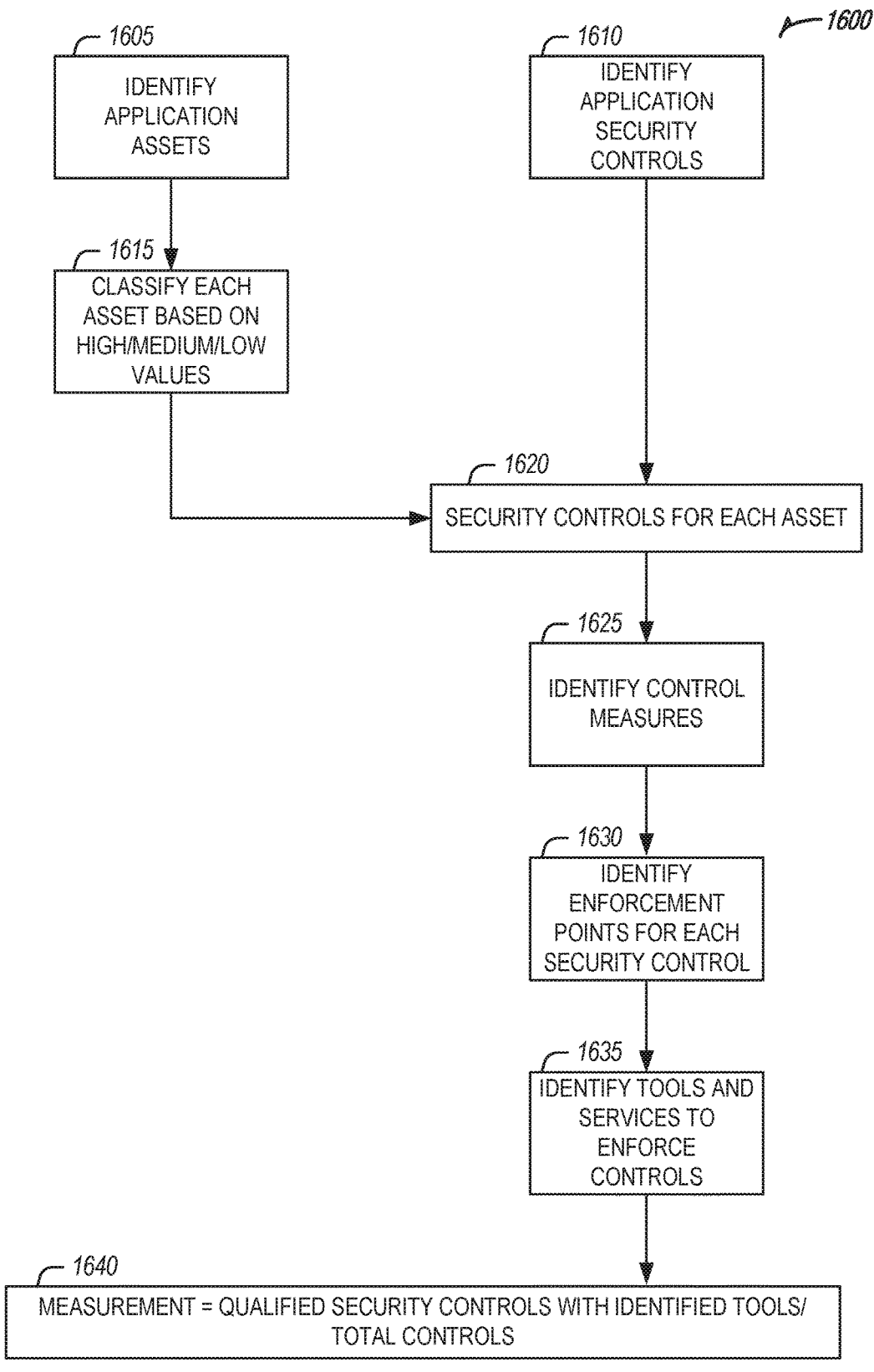
FIG. 16 is a flow diagram of an example process for maturity state calculation for cloud security posture management, according to an embodiment.

FIG. 16 is a flow diagram of an example process 1600 for maturity state calculation for cloud security posture management, according to an embodiment. Application assets are identified (e.g., at operation 1605). Each asset is classified as high, medium, or low (e.g., at operation 1615). Application security controls are identified (e.g., at operation 1610). Security controls from the identified security controls are assigned to each of the classified application assets (e.g., at operation 1620). Control measures are identified (e.g., at operation 1625). Enforcement points are identified for each security control (e.g., at operation 1630). Tools and services are identified to enforce the security controls (e.g., at operation 1635).

A measurement is calculated for the application asset by dividing a number of qualified security controls with identified tools by a total number of available controls (e.g., at operation 1640). The measurement represents a percentage of security controls assigned to the application asset that can be monitored and remediated using available tools and services. A recovery process may be identified for data in the event of a data breach based on an incident document approved by stakeholders including engineering, operations, risk management, and an internal audit team. A recovery measurement may be calculated by dividing a number of data assets with an approved recovery process by a total number of data assets. In an example, weighted averages may be used. For example, a weighted average may be calculated by multiplying an application security score by weight and adding the product of a business continuity score and weight. The result is divided by a sum of all weights to calculate the weighted average.

Figure 17:
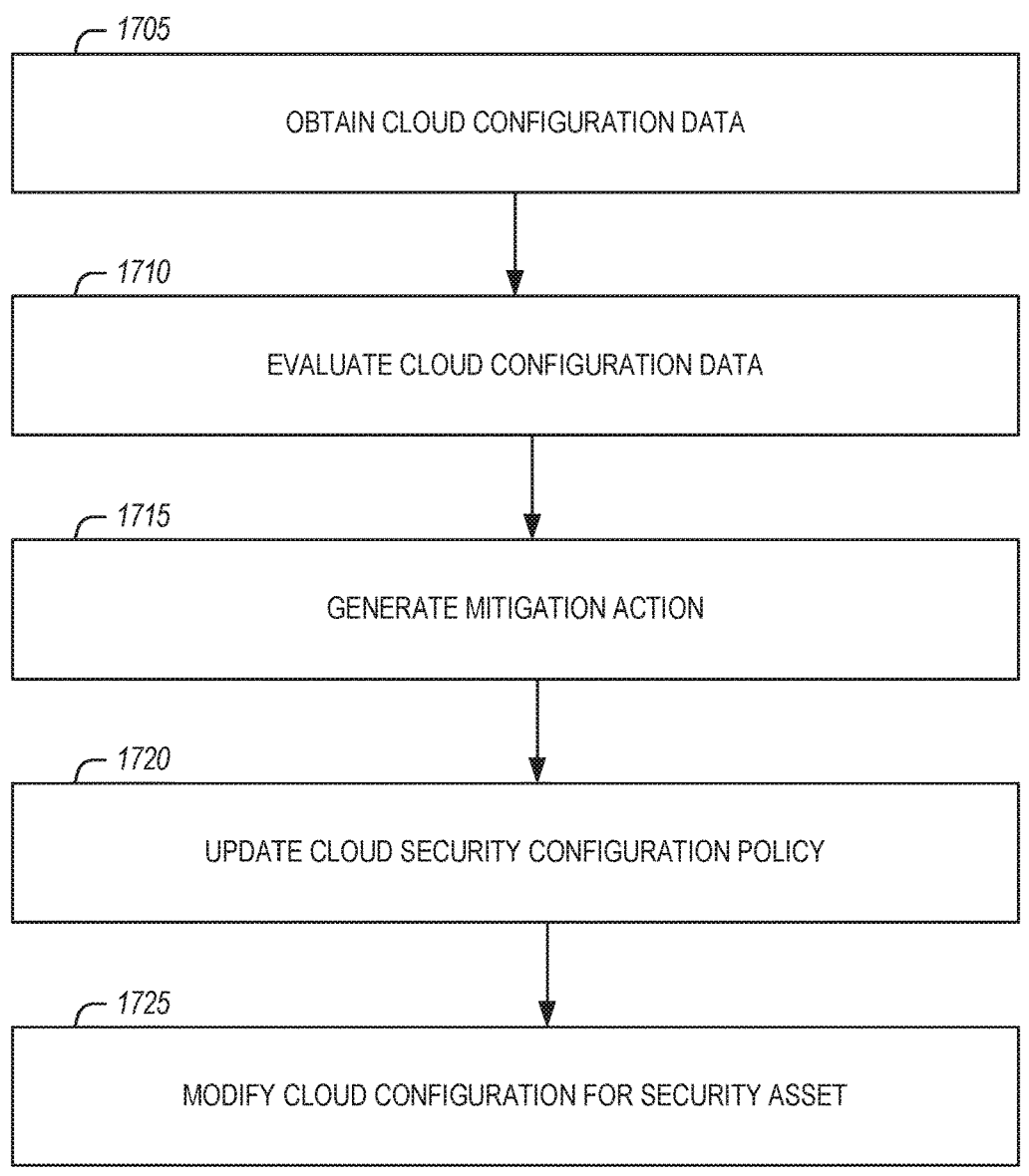
FIG. 17 is a flow diagram of an example of a method for cloud security posture management, according to an embodiment.

FIG. 17 is a flow diagram of an example of a method 1700 for cloud security posture management, according to an embodiment. The method 1700 may provide features as described in FIGS. 1-16.

Cloud configuration data is obtained for a security asset of a cloud computing environment (e.g., at operation 1705). The cloud configuration data is evaluated by a machine learning processor using a requirements-control model to output a probability of a misconfiguration of the security asset (e.g., at operation 1710). A mitigation action is generated for the security asset based on the probability of the misconfiguration being within a threshold (e.g., at operation 1715).

A cloud security configuration policy is updated for the security asset using the mitigation action (e.g., at operation 1720). In an example, security requirements data may be obtained for the cloud computing environment and the security requirements may be aggregated into a unified security requirement. A control library may be generated using control data obtained from a control interface of a cloud computing platform of the cloud computing environment and the cloud security configuration policy for the asset may be generated using the unified security requirement and the control library. The mitigation action is transmitted to the security asset to modify a cloud configuration of the security asset (e.g., at operation 1725).

In an example, a number of controls available for the security asset may be calculated. A number of the controls that have an associated management tool defined in the control library may be calculated. A posture score may be calculated for the security asset using the number of the controls available and the number of the controls that have the associated management tool defined. In an example, an importance classification may be obtained for the security asset. In an example, the importance classification may include an exploitability metric and an impact metric. A weight may be applied to the posture score for the security asset based on the importance classification to create a weighted posture score for the security asset. A total posture score may be calculated for the cloud computing environment using the weighted posture score for the security asset and a set of other weighted posture scores of a set of additional security assets and the total posture score may be output in a dashboard display of a user interface. In an example, the total posture score may be evaluated using a maturity model to determine a maturity level for the cloud computing environment and the maturity level may be output in the dashboard display. In an example, the security asset or the set of additional security assets may include at least one of an automation security asset, a security training security asset, or a third-party security readiness security asset.

Figure 18:
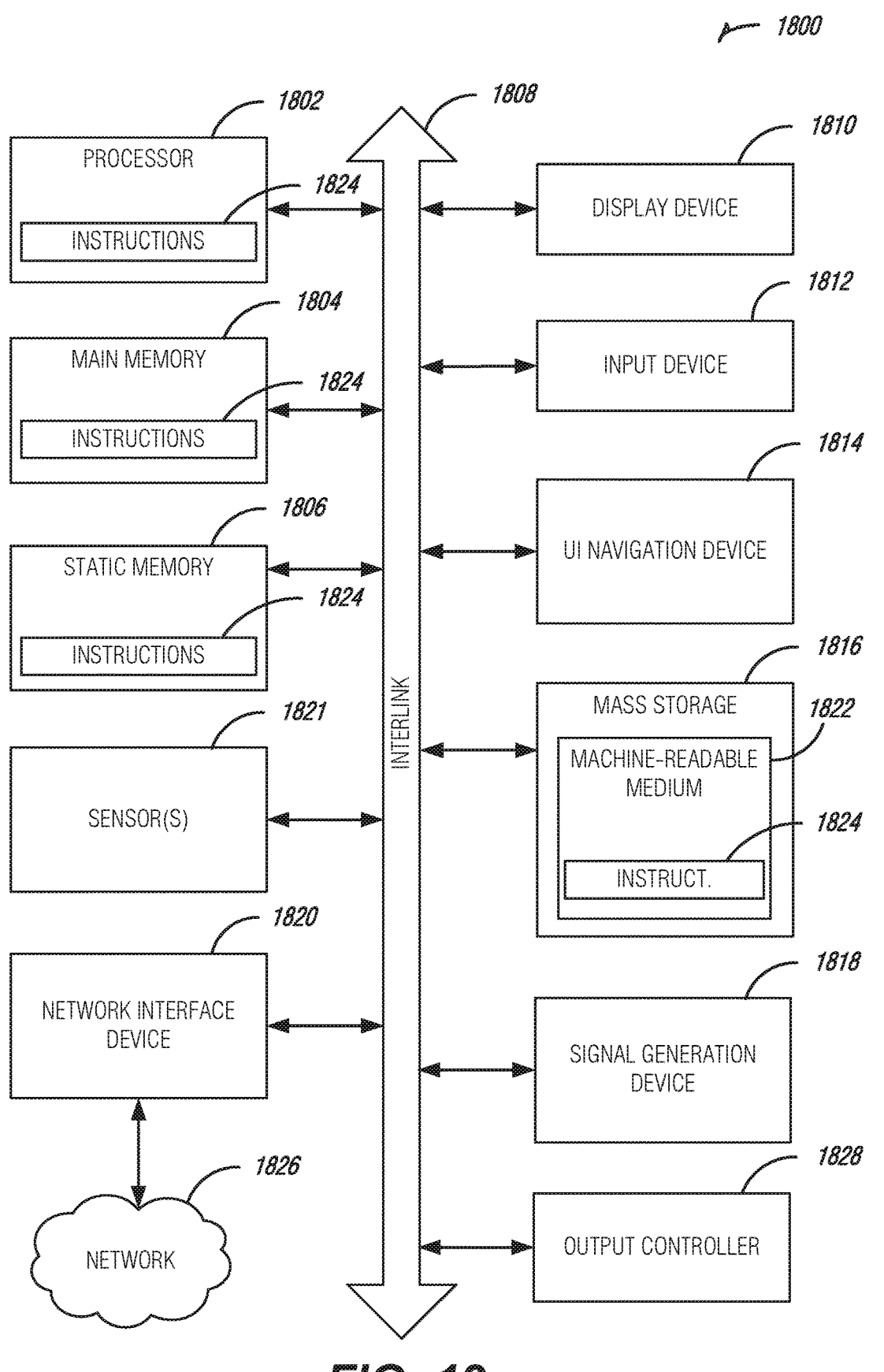
FIG. 18 is a block diagram illustrating an example of a machine upon which one or more embodiments may be implemented.

FIG. 18 illustrates a block diagram of an example machine 1800 upon which any one or more of the techniques (e.g., methodologies) discussed herein may perform. In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in peer-to-peer (P2P) (or other distributed) network environment. The machine 1800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1800 may include a hardware processor 1802 (e.g., a central processing unit (CPU), a graphics processing unit (GPU), a hardware processor core, or any combination thereof), a main memory 1804 and a static memory 1806, some or all of which may communicate with each other via an interlink (e.g., bus) 1808. The machine 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The machine 1800 may additionally include a storage device (e.g., drive unit) 1816, a signal generation device 1818 (e.g., a speaker), a network interface device

1820, and one or more sensors 1821, such as a global positioning system (GPS) sensor, compass, accelerometer, or other sensors. The machine 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1816 may include a machine readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within static memory 1806, or within the hardware processor 1802 during execution thereof by the machine 1800. In an example, one or any combination of the hardware processor 1802, the main memory 1804, the static memory 1806, or the storage device 1816 may constitute machine readable media.

While the machine readable medium 1822 is illustrated as a single medium, the term "machine readable medium" may include a single medium or multiple media (e.g., a centralized or distributed database, and/or associated caches and servers) configured to store the one or more instructions 1824.

The term "machine readable medium" may include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3rd Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1800, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for security posture maturity assessment comprising:

at least one processor; and memory comprising instructions that, when executed by the at least one processor, cause the at least one processor to perform operations to:

obtain deployed and operational cloud configuration data for a security asset of a cloud computing environment, wherein the cloud configuration data includes cloud platform-specific configuration parameters;

evaluate the cloud configuration data by a machine learning processor using a requirements-control model that uses a cloud security configuration policy comprising security requirements data and control library data to output a probability of a misconfiguration of the security asset, wherein the machine learning processor is configured to train the requirements-control model using training data comprising a plurality of controls labeled with associated security requirements fulfilled by the controls and output the probability as a confidence score;

generate a mitigation action for the security asset based on the probability of the misconfiguration being within a threshold;

update a cloud security configuration policy for the security asset using the mitigation action; and transmit the mitigation action to the security asset to modify a cloud configuration of the security asset.

2. The system of claim 1, the memory further comprising instructions that, when executed by the at least one processor, cause the at least one processor to perform operations to:

obtain security requirements data for the cloud computing environment;

aggregate the security requirements into a unified security requirement;

generate a control library using control data obtained from a control interface of a cloud computing platform of the cloud computing environment; and generate the cloud security configuration policy for the asset using the unified security requirement and the control library.

3. The system of claim 2, the memory further comprising instructions that, when executed by the at least one processor, cause the at least one processor to perform operations to:

calculate a number of controls available for the security asset;

identify a number of the controls that have an associated management tool defined in the control library; and calculate a posture score for the security asset using the number of the controls available and the number of the controls that have the associated management tool defined.

4. The system of claim 3, the memory further comprising instructions that, when executed by the at least one processor, cause the at least one processor to perform operations to:

obtain an importance classification for the security asset;

apply a weight to the posture score for the security asset based on the importance classification to create a weighted posture score for the security asset;

calculate a total posture score for the cloud computing environment using the weighted posture score for the security asset and a set of other weighted posture scores of a set of additional security assets; and output the total posture score in a dashboard display of a user interface.

5. The system of claim 4, the memory further comprising instructions that, when executed by the at least one processor, cause the at least one processor to perform operations to:

evaluate the total posture score using a maturity model to determine a maturity level for the cloud computing environment; and output the maturity level in the dashboard display.

6. The system of claim 4, wherein the set of additional security assets includes at least one of an automation security asset, a security training security asset, or a third-party security readiness security asset.

7. The system of claim 4, wherein the importance classification includes an exploitability metric and an impact metric.

8. At least one non-transitory machine-readable medium comprising instructions for security posture maturity assessment that, when executed by at least one processor, cause the at least one processor to perform operations to:

obtain deployed and operational cloud configuration data for a security asset of a cloud computing environment, wherein the cloud configuration data includes cloud platform-specific configuration parameters;

evaluate the cloud configuration data by a machine learning processor using a requirements-control model that uses a cloud security configuration policy comprising security requirements data and control library data to output a probability of a misconfiguration of the security asset, wherein the machine learning processor is configured to train the requirements-control model using training data comprising a plurality of controls labeled with associated security requirements fulfilled by the controls and output the probability as a confidence score;

generate a mitigation action for the security asset based on the probability of the misconfiguration being within a threshold;

update a cloud security configuration policy for the security asset using the mitigation action; and transmit the mitigation action to the security asset to modify a cloud configuration of the security asset.

9. The at least one non-transitory machine-readable medium of claim 8, further comprising instructions that, when executed by the at least one processor, cause the at least one processor to perform operations to:

obtain security requirements data for the cloud computing environment;

aggregate the security requirements into a unified security requirement;

generate a control library using control data obtained from a control interface of a cloud computing platform of the cloud computing environment; and generate the cloud security configuration policy for the asset using the unified security requirement and the control library.

10. The at least one non-transitory machine-readable medium of claim 9, further comprising instructions that, when executed by the at least one processor, cause the at least one processor to perform operations to:

calculate a number of controls available for the security asset;

identify a number of the controls that have an associated management tool defined in the control library; and calculate a posture score for the security asset using the number of the controls available and the number of the controls that have the associated management tool defined.

11. The at least one non-transitory machine-readable medium of claim 10, further comprising instructions that, when executed by the at least one processor, cause the at least one processor to perform operations to:

obtain an importance classification for the security asset;

apply a weight to the posture score for the security asset based on the importance classification to create a weighted posture score for the security asset;

calculate a total posture score for the cloud computing environment using the weighted posture score for the security asset and a set of other weighted posture scores of a set of additional security assets; and output the total posture score in a dashboard display of a user interface.

12. The at least one non-transitory machine-readable medium of claim 11, further comprising instructions that, when executed by the at least one processor, cause the at least one processor to perform operations to:

evaluate the total posture score using a maturity model to determine a maturity level for the cloud computing environment; and output the maturity level in the dashboard display.

13. The at least one non-transitory machine-readable medium of claim 11, wherein the set of additional security assets includes at least one of an automation security asset, a security training security asset, or a third-party security readiness security asset.

14. The at least one non-transitory machine-readable medium of claim 11, wherein the importance classification includes an exploitability metric and an impact metric.

15. A method for security posture maturity assessment comprising:

obtaining deployed and operational cloud configuration data for a security asset of a cloud computing environment, wherein the cloud configuration data includes cloud platform-specific configuration parameters;

evaluating the cloud configuration data by a machine learning processor using a requirements-control model to output a probability of a misconfiguration of the security asset that uses a cloud security configuration policy comprising security requirements data and control library data, wherein the machine learning processor is configured to train the requirements-control model using training data comprising a plurality of controls labeled with associated security requirements fulfilled by the controls and output the probability as a confidence score;

generating a mitigation action for the security asset based on the probability of the misconfiguration being within a threshold;

updating a cloud security configuration policy for the security asset using the mitigation action; and transmitting the mitigation action to the security asset to modify a cloud configuration of the security asset.

16. The method of claim 15, further comprising:

obtaining security requirements data for the cloud computing environment;

aggregating the security requirements into a unified security requirement;

generating a control library using control data obtained from a control interface of a cloud computing platform of the cloud computing environment; and generating the cloud security configuration policy for the asset using the unified security requirement and the control library.

17. The method of claim 16, further comprising:

calculating a number of controls available for the security asset;

identifying a number of the controls that have an associated management tool defined in the control library; and calculating a posture score for the security asset using the number of the controls available and the number of the controls that have the associated management tool defined.

18. The method of claim 17, further comprising:

obtaining an importance classification for the security asset;

applying a weight to the posture score for the security asset based on the importance classification to create a weighted posture score for the security asset;

calculating a total posture score for the cloud computing environment using the weighted posture score for the security asset and a set of other weighted posture scores of a set of additional security assets; and outputting the total posture score in a dashboard display of a user interface.

19. The method of claim 18, further comprising:

evaluating the total posture score using a maturity model to determine a maturity level for the cloud computing environment; and outputting the maturity level in the dashboard display.

20. The method of claim 18, wherein the set of additional security assets includes at least one of an automation security asset, a security training security asset, or a third-party security readiness security asset.

21. The method of claim 18, wherein the importance classification includes an exploitability metric and an impact metric.

* * * * *